United States Patent
Oulianov et al.

(10) Patent No.: US 11,994,688 B2
(45) Date of Patent: May 28, 2024

(54) DEPOLARIZING HOMOGENIZER

(71) Applicant: NKT PHOTONICS A/S, Birkerød (DK)

(72) Inventors: Dmitri Oulianov, Birkerød (DK); Frederik Nielsen, Birkerød (DK); Irnis Kubat, Birkerød (DK); Thomas Feuchter, Birkerød (DK); Timur Iskhakov, Birkerød (DK)

(73) Assignee: NKT PHOTONICS A/S, Birkerod (DK)

( * ) Notice: Subject to any disclaimer, the term of this patent is extended or adjusted under 35 U.S.C. 154(b) by 0 days.

(21) Appl. No.: 18/339,860

(22) Filed: Jun. 22, 2023

(65) Prior Publication Data

US 2023/0350219 A1 Nov. 2, 2023

Related U.S. Application Data

(63) Continuation of application No. 16/641,468, filed as application No. PCT/EP2018/072888 on Aug. 24, 2018, now abandoned.

(30) Foreign Application Priority Data

Aug. 25, 2017 (GB) ..................... 1713740

(51) Int. Cl.
*G02B 27/28* (2006.01)
*G02B 27/09* (2006.01)
(Continued)

(52) U.S. Cl.
CPC ....... *G02B 27/286* (2013.01); *G02B 27/0961* (2013.01); *G02B 27/283* (2013.01); *G02F 1/133526* (2013.01); *G02F 1/13362* (2013.01)

(58) Field of Classification Search
CPC .............. G02B 27/286; G02B 27/0961; G02B 27/283; G02F 1/13362; G02F 1/133526; H01S 3/005
See application file for complete search history.

(56) References Cited

U.S. PATENT DOCUMENTS

| 4,619,508 A | 10/1986 | Shibuya et al. |
| 5,253,110 A | 10/1993 | Ichihara et al. |
| (Continued) | | |

FOREIGN PATENT DOCUMENTS

| CN | 1264841 A | 8/2000 |
| CN | 1591091 A | 3/2005 |
| (Continued) | | |

OTHER PUBLICATIONS

Handbook of Optics, vol. 3, 2nd Edition, 2001, 2 pages.
(Continued)

*Primary Examiner* — Bao-Luan Q Le
(74) *Attorney, Agent, or Firm* — BUCHANAN, INGESOLL & ROONEY PC

(57) ABSTRACT

A depolarizing homogenizer including one or more lenslet arrays, for providing a plurality of beamlets associated with different respective parts of a received beam. The depolarizing homogenizer includes a depolarizer comprising different areas which affect polarization differently, the depolarizer being positioned to cause alteration of the polarization characteristics of at least some of the plurality of beamlets. A lens is arranged to at least partially overlap the beamlets having the altered polarization characteristics.

13 Claims, 6 Drawing Sheets

(51) Int. Cl.
    *G02F 1/1335*    (2006.01)
    *G02F 1/13357*   (2006.01)

(56) References Cited

U.S. PATENT DOCUMENTS

| | | |
|---|---|---|
| 5,373,335 A | 12/1994 | Street |
| 5,533,152 A | 7/1996 | Kessler |
| 5,653,537 A | 8/1997 | Ignatowicz et al. |
| 6,208,451 B1 | 3/2001 | Itoh |
| 6,498,869 B1 | 12/2002 | Yao |
| 6,535,273 B1 | 3/2003 | Maul |
| 6,594,090 B2 | 7/2003 | Kruschwitz et al. |
| 8,016,428 B2 | 9/2011 | Kasazumi et al. |
| 8,264,668 B2 | 9/2012 | Fiolka et al. |
| 8,902,506 B2 | 12/2014 | Mizuyama et al. |
| 8,928,859 B2 | 1/2015 | Fiolka et al. |
| 9,160,137 B1 | 10/2015 | Abdolvand et al. |
| 9,170,499 B2 | 10/2015 | Fiolka et al. |
| 9,466,941 B2 | 10/2016 | Janssens et al. |
| 9,504,374 B2 | 11/2016 | Thomsen et al. |
| 9,739,448 B2 | 8/2017 | Du et al. |
| 10,119,674 B2 | 11/2018 | Nakazato et al. |
| 10,908,076 B2 | 2/2021 | Thienpont et al. |
| 2002/0021441 A1 | 2/2002 | Norton et al. |
| 2003/0039036 A1 | 2/2003 | Kruschwitz et al. |
| 2005/0073472 A1 | 4/2005 | Kim et al. |
| 2008/0212091 A1 | 9/2008 | Tanaka et al. |
| 2009/0115990 A1 | 5/2009 | Owa et al. |
| 2010/0002217 A1 | 1/2010 | Fiolka et al. |
| 2010/0020291 A1 | 1/2010 | Kasazumi et al. |
| 2010/0165307 A1 | 7/2010 | Mizushima et al. |
| 2012/0057131 A1 | 3/2012 | Li et al. |
| 2012/0062848 A1 | 3/2012 | Koyanagi et al. |
| 2012/0080411 A1 | 4/2012 | Mizuyama et al. |
| 2012/0081786 A1 | 4/2012 | Mizuyama et al. |
| 2012/0147279 A1 | 6/2012 | Koyanagi et al. |
| 2012/0293786 A1 | 11/2012 | Fiolka et al. |
| 2014/0036943 A1 | 2/2014 | Janssens et al. |
| 2015/0001408 A1 | 1/2015 | Frank et al. |
| 2015/0138507 A1 | 5/2015 | Thomsen et al. |
| 2015/0153654 A1 | 6/2015 | Fiolka et al. |
| 2015/0247617 A1 | 9/2015 | Du et al. |
| 2016/0245471 A1 | 8/2016 | Nakazato et al. |
| 2019/0086325 A1 | 3/2019 | Thienpont et al. |
| 2020/0209640 A1 | 7/2020 | Oulianov et al. |

FOREIGN PATENT DOCUMENTS

| | | |
|---|---|---|
| CN | 101169820 A | 4/2008 |
| CN | 201555989 U | 8/2010 |
| CN | 101819375 A | 9/2010 |
| CN | 103024417 A | 4/2013 |
| CN | 108897084 A | 11/2018 |
| EP | 1693885 A1 | 8/2006 |
| JP | H03254114 A | 11/1991 |
| JP | 2008-180650 | 8/2008 |
| JP | 2014-170955 A | 9/2014 |
| WO | 2008/107025 A1 | 9/2008 |
| WO | 2016/125222 A1 | 8/2016 |

OTHER PUBLICATIONS

SuperK EHTREME, High Power Supercontinuum Fiber Laser Series, NKT—Photonics, 6 pages.
SuperK MIR, Mid Infrared Supercontinuum Fiber Laser, NKT—Photonics, 2 pages.
Office Action (Decision of Rejection) dated Jul. 20, 2022, issued in the corresponding Chinese Patent Application No. 201880066683.7, 15 pages including 11 pages of English Translation.
Office Action (The First Office Action) dated Sep. 3, 2021, issued in the corresponding Chinese Patent Application No. 201880066683.7, 17 pages including 9 pages of English Translation.
Office Action (The Second Office Action) dated Apr. 20, 2022. Issued in the corresponding Chinese Patent Application No. 201880066683.7, 16 pages including 9 pages of English Translation.
Office Action (Communication pursuant to Article 94(3) EPC) dated Sep. 13, 2022, issued in the corresponding European Patent Application No. 18769291.8, 6 pages.
Office Action (Communication pursuant to Article 94(3) EPC) dated Sep. 10, 2021, issued in the corresponding European Patent Application No. 18769291.8, 7 pages.
UK Combined Search & Examination Report (Patents Act 1977: Search Report under Section 17) dated Jan. 19, 2018, issued in the corresponding Application GB 1713740.7, 11 pages.
International Search Report (PCT/ISA/210) issued on Nov. 29, 2018, by the European Patent Office as the International Searching Authority for International Application No. PCT/EP2018/072888, 4 pages.
Written Opinion (PCT/ISA/237) issued on Nov. 29, 2018, by the European Patent Office as the International Searching Authority for International Application No. PCT/EP2018/072888, 7 pages.
Ranka, et al., "Visible Continuum Generation in Air-silica Microstructure Optical Fibers with Anomalous Dispersion at 800 Nm", Optics Letters vol. 25, No. 1, Jan. 1, 2000, pp. 25-27.
Request for the Submission of an Opinion issued by the Korean Patent Office in Korean Patent Application No. 10-2020-700754, dated Dec. 12, 2023, with English Translation (7 pages).

DEPOLARIZING HOMOGENIZER

FIELD

This specification relates to a depolarizing homogenizer, and to a light source comprising a depolarizing homogenizer. In some examples the light source includes a supercontinuum source.

BACKGROUND

Depolarizers in the form of patterned retarders or quartz-wedge depolarizers alter the polarization characteristics of a received beam of light to provide a depolarized output beam. Such depolarizers convert the received beam into a pseudo-random polarized beam, i.e. the polarization varies spatially in a cross section of the beam perpendicular to the beam path.

This variation of the polarization characteristics across the beam profile may not be desired in some applications which employ depolarized beams.

SUMMARY

This specification provides a depolarizing homogenizer. The depolarizing homogenizer includes one or more lenslet arrays, adapted for providing a plurality of beamlets associated with different respective parts of a received beam. The depolarizing homogenizer also includes a depolarizer comprising different areas which affect polarization differently. The depolarizer is positioned to cause alteration of the polarization characteristics of at least some of said plurality of beamlets. The depolarizing homogenizer also includes a lens arranged to at least partially overlap the said beamlets having said altered polarization characteristics.

By at least partially overlapping beamlets having altered polarization characteristics, an output beam is produced having a high degree of depolarization. In particular, the degree of depolarization may be substantially uniform over a cross section of the beam perpendicular to the beam path (or a substantial region thereof). In other words, the degree of depolarization may be substantially uniform over a substantial region of the beam profile.

The received beam may be coherent, incoherent or partly coherent (temporally and/or spatially). In the case of a coherent beam, the depolarizer may additionally help reduce interference fringes (speckle effect), because beams from individual lenslets having different polarizations may not interfere in the image plane of the lens.

The depolarizer may comprise a liquid crystal polymer or a quartz crystal wedge depolarizer. In some embodiments the depolarizer may comprise an electronically controlled liquid crystal depolarizer, which may be configured to change polarization characteristics of different parts of the depolarizer in time.

The depolarizer may comprise a first depolarizing element having a first optic axis and a second depolarizing element have a second optic axis, wherein the first and second depolarizing elements are oriented such that the first and second optic axes are perpendicular to one another. In the case of a quartz crystal wedge depolarizer comprising two quartz crystal wedges, one thicker than the other, the optic axis may be defined by the optic axis of the thicker wedge. In the case of a liquid crystal polymer depolarizer comprising retardation lines, the optic axis may be defined by the retardation lines. Thus, two liquid crystal polymer depolarizers may be oriented such that their respective first and second optic axes are perpendicular by orienting the two depolarizers so that equal retardation lines of respective depolarizers are perpendicular to one another.

The depolarizer may be positioned to receive said plurality of beamlets, wherein at least some of said beamlets pass through respective different areas of the depolarizer, thereby to alter the polarization characteristics of said at least some beamlets. The depolarizer may be located between the one or more lenslet arrays and the lens. Alternatively, the lens may be located between the one or more lenslet arrays and the depolarizer.

Further alternatively, the depolarizer may be configured to depolarise light before the light passes through the one or more lenslet arrays to form said plurality of beamlets, thereby to cause alteration of the polarization characteristics of at least some of said plurality of beamlets. In some example configurations the one or more lenslet arrays may be located between the depolarizer and the lens.

The depolarizing homogenizer may further comprise a fibre bundle, wherein the fibre bundle includes a plurality of optical fibres for guiding light. The depolarizer may be located between an output of the fibre bundle and the image plane of the lens. The depolarizing homogenizer may include a collimating lens to receive light from the fibre bundle and to collimate the received light. The one or more lenslet arrays may be arranged to receive light which has been collimated by the collimating lens.

A lenslet array may comprise a plurality of lenslets arranged in a plane which is perpendicular to the direction of the received beam.

The lenslets may comprise microlenses, e.g. cylindrical microlenses.

The focal lengths of the lenslets in a lenslet array may be the same and/or one or more lenslets of one lenslet array may have the same focal length as one or more lenslets of a second lenslet array.

The one or more lenslet arrays may comprise a plurality of lenslets shaped to cause the output beam to have a flat top beam profile.

The one or more lenslet arrays may comprise a plurality of lenslets shaped to cause the output beam to have a square or rectangular beam profile.

The one or more lenslet arrays may comprise a first lenslet array and a second lenslet array. The first and second lenslet arrays may be spaced apart. The spacing may be less than the focal length of one of more lenslets in the first and/or the second array.

The first and second lenslet arrays may be oriented at an angle (e.g. perpendicular) to one other. In the case of first and second lenslets arrays having respective non-symmetric lenslets (e.g. cylindrical microlenses), the first and second lenslet arrays may be oriented with respect to one another so that the lenslets of the respective arrays are oriented at an angle (e.g. perpendicular) to one another.

The beamlets may be collimated.

The lens may be configured to form overlapping images of the lenslet array cells in an image plane. The image plane may comprise a work surface.

This specification also provides a light source comprising the depolarizing homogenizer. The light source may include a linearly polarized or partially linearly polarized source. The beam received by the one or more lenslet arrays of the depolarizing homogenizer may be derived from said linearly polarized or partially linearly polarized source.

In some embodiments the light source includes a supercontinuum source configured to generate a supercontinuum, wherein the beam received by the one or more lenslet arrays of the depolarizing homogenizer is derived from said supercontinuum source. In various embodiments the supercontinuum spectrum that is generated includes the wavelength range 375 nm to 1200 nm. In some embodiments the supercontinuum spectrum that is generated includes the wavelength range 375 nm to 2400 nm. In some embodiments the supercontinuum that is generated may comprise a mid-infrared supercontinuum which may include the wavelength range 1100 nm to 4200 nm. The light source may further comprise a wavelength selector to select one or more wavelengths from the supercontinuum.

In various embodiments the output beam may have a polarization extinction ratio of 1 dB or less, 0.5 dB or less, 0.1 dB or less, or 0.05 dB or less.

This specification also provides a depolarization method, comprising dividing received light into a plurality of beamlets, causing alteration of the polarization characteristics of at least some of said plurality of beamlets, and providing a depolarized output beam by at least partially overlapping the beamlets having said altered polarization characteristics.

The method may comprise altering the polarization characteristics of at least some of said plurality of beamlets after said plurality of beamlets have been divided from said received light. Alternatively, the method may comprise depolarizing the received light before it is divided, thereby altering the polarization characteristics of at least some of said plurality of beamlets.

The specification also provides an optical arrangement configured to carry out the method.

This specification also provides a light source. The light source can comprise a supercontinuum source for generating a supercontinuum, a wavelength selector for selecting light at one or more wavelengths from the supercontinuum, and a fibre bundle comprising a plurality of optical fibres arranged to guide light selected by the wavelength selector, and to output light at the one or more selected wavelengths, and a depolarizing homogenizer configured to receive light which has been output by the fibre bundle.

As will be understood by those skilled in the art, the term "light" as used herein is not limited to visible light and instead includes any suitable electromagnetic radiation such as infrared light (including near and far infrared light), visible light and ultraviolet light.

BRIEF DESCRIPTION OF THE FIGURES

Example embodiments will now be described with reference to the accompanying figures, in which:

FIG. 5b is a close-up of a region of the graph of FIG. 5a.

DETAILED DESCRIPTION

Figure 1:
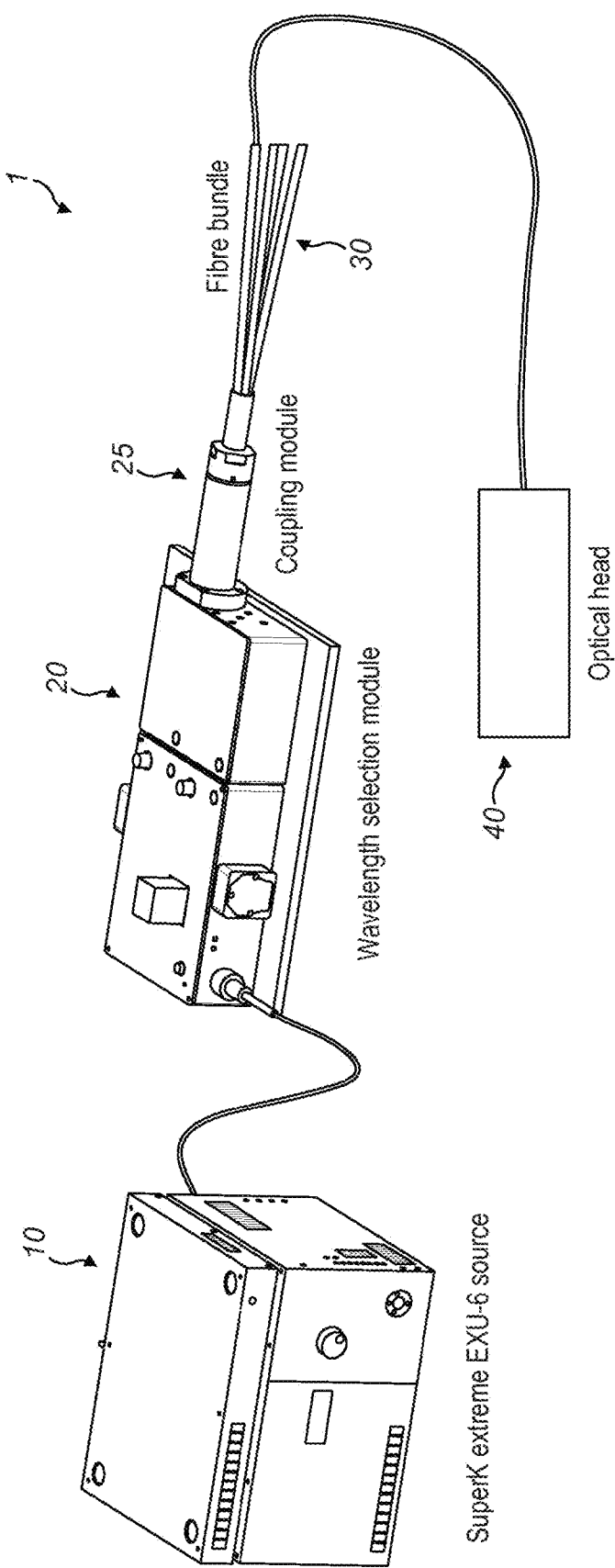
FIG. 1 is a schematic illustration of a light source according to one example embodiment.

FIG. 1 shows a light source 1 according to one example. As shown, the light source includes a supercontinuum source 10, a wavelength selection module 20, a coupling module 25, a fibre bundle 30 and an optical head 40.

The supercontinuum source 10 comprises a source which generates a broadband spectral output in the form of a supercontinuum. Supercontinuum generation is known per se and will not be described in detail here. Reference is directed to "Visible continuum generation in air silica microstructure optical fibres with anomalous dispersion at 800 nm", J. K. Ranka, R. S. Windeler, and A. J. Stentz, Optics Letters, 2000. Vol. 25: p. 25-27. An exemplary commercially-available supercontinuum source is the SuperK Extreme EXU-6 source from NKT Photonics A/S. In a supercontinuum source, the temporal coherence may be low and the spatial coherence may be high. That is, the supercontinuum light may be spatially coherent and temporally incoherent.

The wavelength selection module 20 is configured to select one or more wavelengths from the broadband output produced by the supercontinuum source 10. In the example of FIG. 1, the wavelength selection module is a tunable multi-wavelength filter based on an acousto-optic filter. An exemplary commercially available tunable multi-wavelength filter based on acousto-optic tunable filter technology is the SuperK SELECT product from NKT Photonics A/S. The output of the wavelength selection module may be linearly polarized. The temporal coherence of the output may be low, e.g. the output may be temporally incoherent. The supercontinuum spectrum that is generated may include the range 375 nm to 1200 nm. In some example implementations the bandwidth of the supercontinuum may extend from 375 nm to 2400 nm. In some example implementations the supercontinuum that is generated may comprise a mid-infrared supercontinuum which may extend from 1100 nm to 4200 nm.

The light source 1 further comprises a coupling module 25 arranged to couple the one or more wavelengths selected by the wavelength selection module 20 into a fibre bundle 30. The coupling module 25 may include a homogenizing light pipe (HLP) in the form of an elongated rod or tube capable of propagating light and of homogenizing the intensity distribution of the propagated light. The HLP may comprise a light-guiding region comprising a transparent medium with cross-sectional dimensions greater than the wavelength(s) of the guided light. The HLP may be formed by appropriately shaping a dielectric medium (e.g. forming a polygonal glass rod), or by providing a tubular wall with a reflective inner surface, which defines the light-guiding region and which typically has an appropriate rotationally asymmetric (i.e. non-circular) cross-section that homogenizes the light irradiance by multiple reflections off the boundary or boundaries of the HLP.

Light from the wavelength selection module 20 may be coupled into an input end of the HLP of the coupling module, e.g. via free space optics and/or via an optical fibre. The exit end of the HLP may be butt coupled to the common packed input end of the fibre bundle 30. The fibre bundle 30 comprises a plurality of optical fibres (e.g. a plurality of multimode fibres) which guide light at the wavelengths selected by the wavelength selector.

Figure 2A:
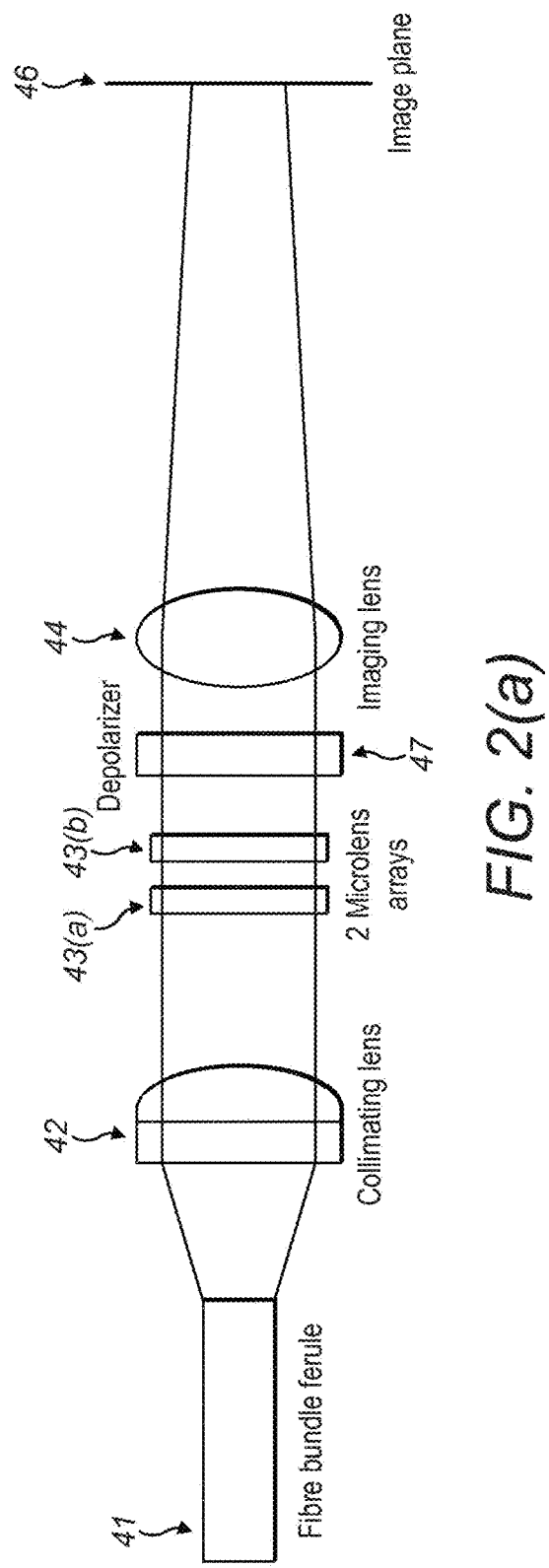
FIG. 2(a) is a schematic illustration showing components of a depolarizing homogenizer in accordance with one example embodiment.

The fibre bundle 30 is terminated with the optical head 40. Components of the optical head are shown in FIG. 2(a). As show, a fiber bundle ferule 41 is located at the input of the optical head. The fiber bundle ferule emits a divergent beam, which is received at a collimating lens 42 which collimates the beam. The collimated beam then passes through two lenslet arrays in the form of cylindrical microlens arrays 43a, 43b. An imaging lens 44 (which may also be referred to herein as a "Fourier lens" or a "focusing lens"), is arranged to form an image in image plane 46. A depolarizer 47 is located between the lenslet arrays and the imaging lens 44.

Figure 3:
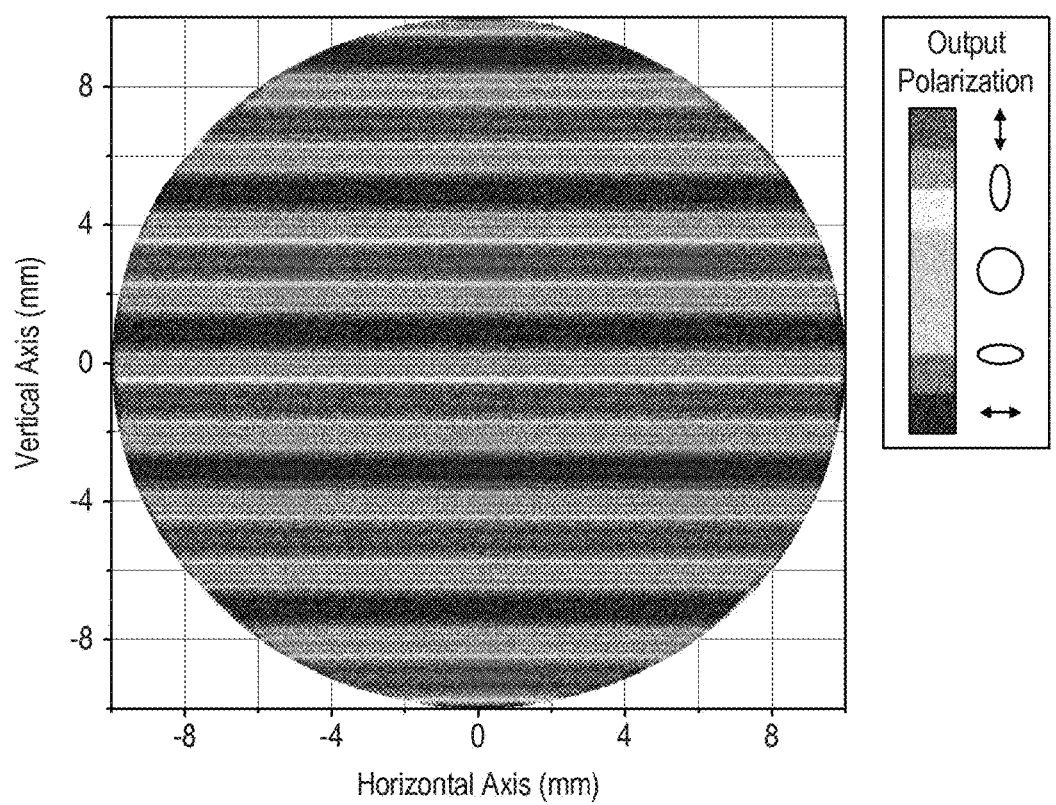
FIG. 3 shows the polarization distribution of a linearly polarized monochromatic beam after it has been passed through a quartz crystal depolarizer.

The depolarizer 47 may comprise a patterned retarder in the form of an achromatic liquid crystal polymer depolarizer. Alternatively, or in addition, the depolarizer may comprise a quartz crystal wedge depolarizer. Achromatic liquid crystal polymer depolarizers and quartz crystal wedge depolarizers are known per se and will not be described in detail here: suitable depolarizers are commercially available from Thorlabs under product numbers DPP25-A and DPU25-A. In general, such depolarizers comprise different areas which affect polarization differently. Hence, if a linearly polarized monochromatic beam having a beamwidth which spans multiple of these areas is passed through such a depolarizer, the polarization of different regions of the beam profile will be altered in different ways, resulting in variation of the polarization in a cross section perpendicular to the beam direction; this is illustrated schematically in FIG. 3.

In contrast, in the arrangement of FIG. 2(a), the microlenses of the cylindrical microlens arrays 43a, 43b are configured to form a plurality of beamlets associated with different respective parts of the received beam. In FIG. 2(a), the depolarizer is positioned after the microlens arrays 43a, 43b so that beamlets pass through respective different areas of the depolarizer and are therefore subject to different polarization retardation. The imaging lens 44 is configured to form overlapping images of the microlens array cells in the same region of the image plane. Thus, the beamlets, which have been subjected to different polarization retardation, are scrambled in the image plane, resulting in an output beam having a high degree of depolarization uniformly distributed across the beam. In one embodiment, contributions to depolarization are also provided by changes in polarization characteristics resulting from propagation through the fiber bundle, and other optical components of the light source 1.

In addition, the arrangement of the cylindrical microlens arrays 43a, 43b and imaging lens 44 acts as an intensity homogenizer, i.e. it homogenizes the intensity across the beam profile. This is because the imaging lens 44 is configured to form overlapping images of the beamlets, and therefore the intensity profiles of individual beamlets associated with different parts of the received beam are "averaged out" in the image plane, resulting in an output beam with a homogenized intensity profile.

The beam profile of the output beam is determined by the shape of the lenslets. For example, the lenslets in the lenslet arrays may be shaped so that the image which is formed in the image plane is of a flat top (e.g. square) homogenized beam. The homogenizing light pipe discussed above also contributes to the degree of homogenization of the output beam.

Figure 4:
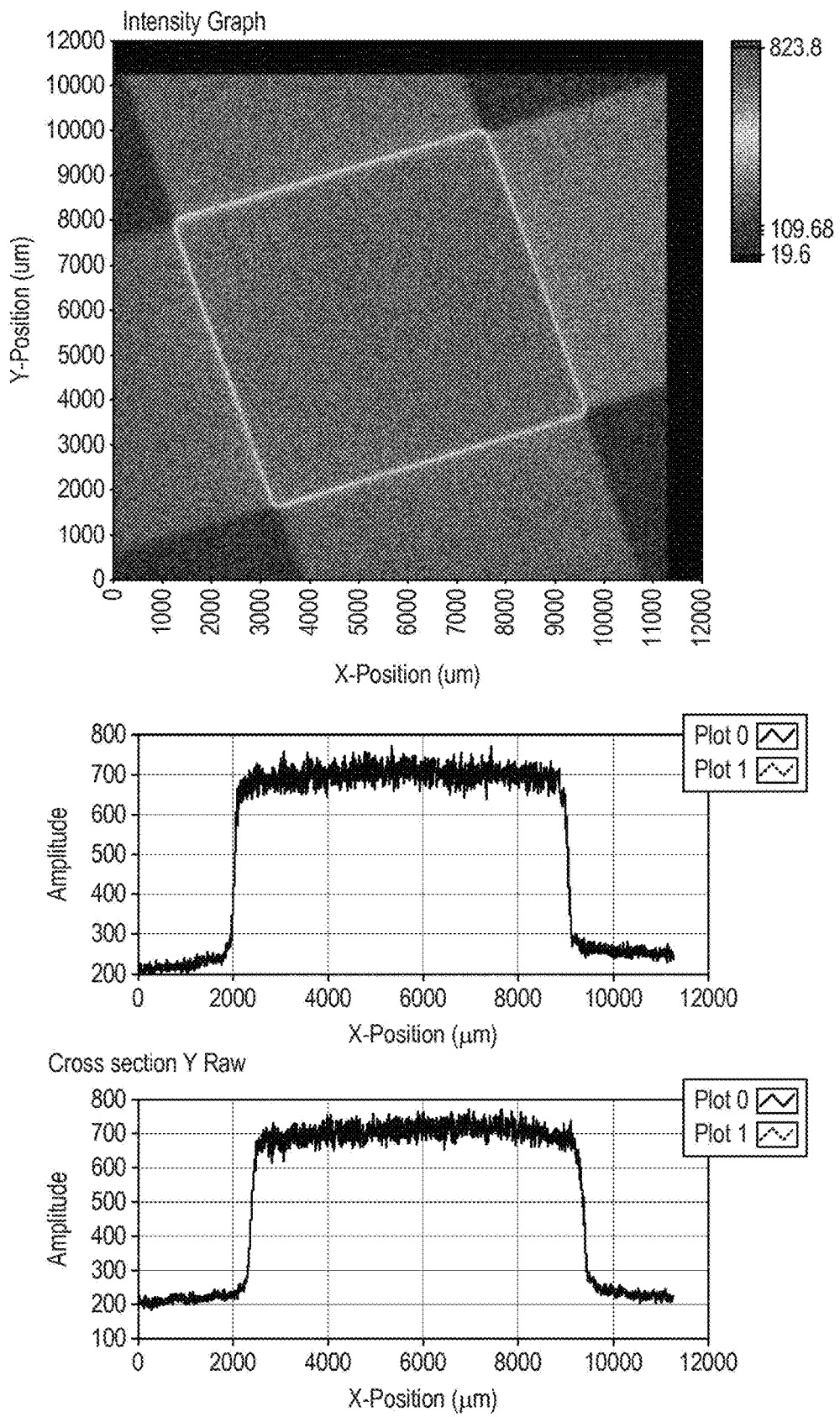
FIG. 4 shows the result of a beam profile measurement of the output beam of the system of FIG. 2(a) after has been passed through a polarizer.

FIG. 4 shows the result of a beam profile measurement of the output beam of the system of FIG. 2(a) after has been passed through a polarizer. As shown a homogenized intensity distribution is obtained. In contrast, significant intensity variations would be expected if there were significant polarization change across the beam.

Figure 2B:
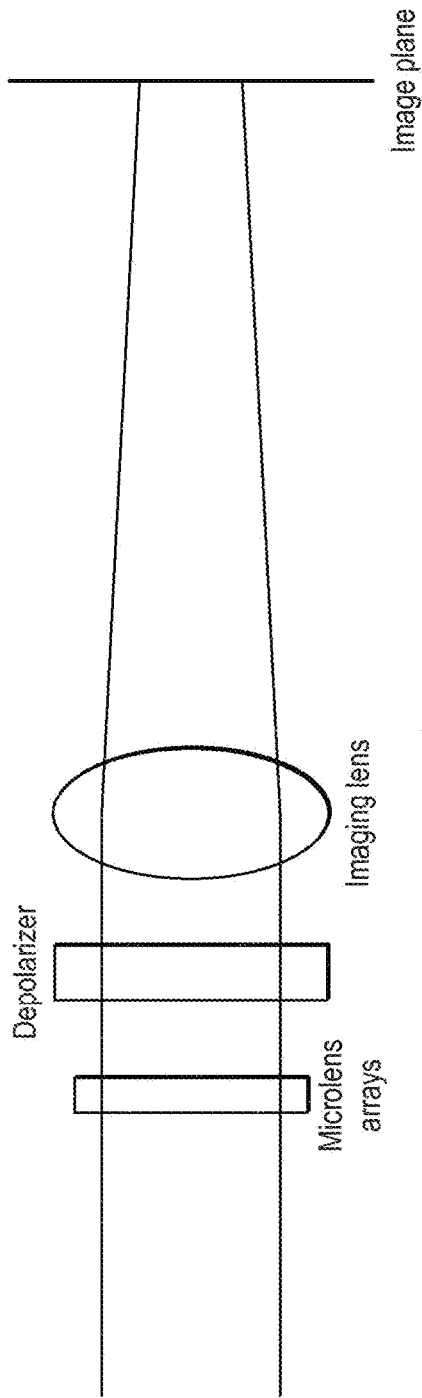
FIG. 2(b) is a schematic illustration showing components of a depolarizing homogenizer in accordance with an example embodiment.
Figure 2C:
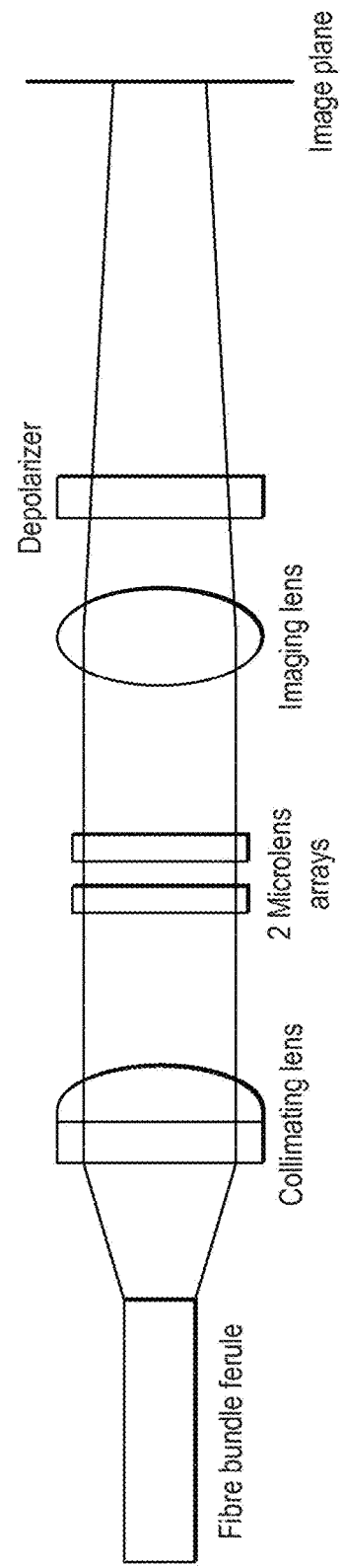
FIG. 2(c) is a schematic illustration showing components of a depolarizing homogenizer in accordance with an example embodiment.
Figure 5A:
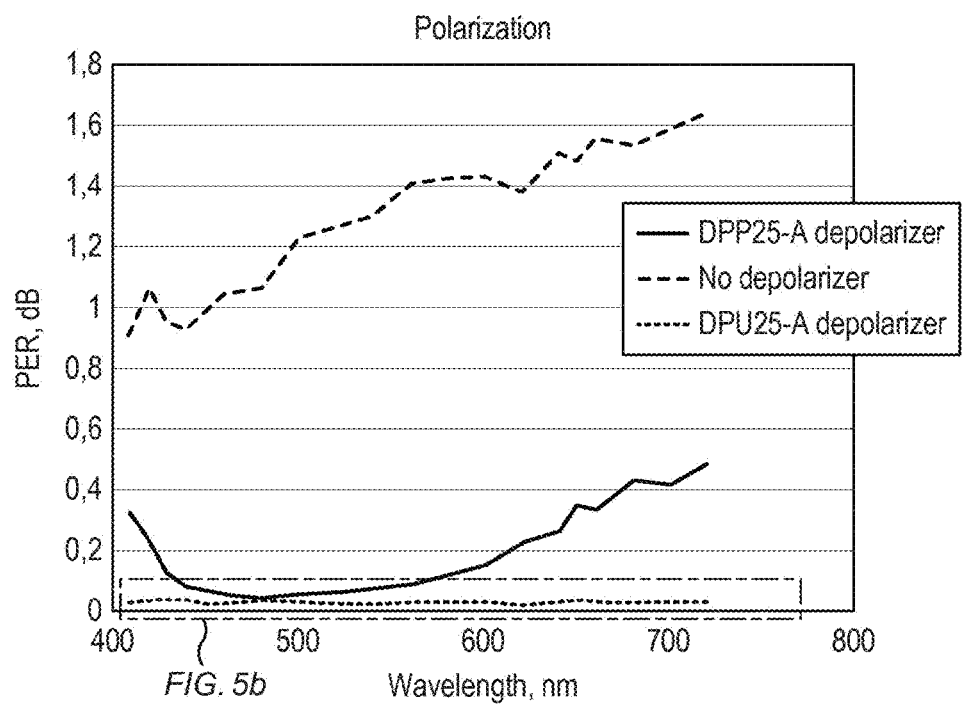
FIG. 5a shows the results of polarization extinction ratio measurements.
Figure 5B:
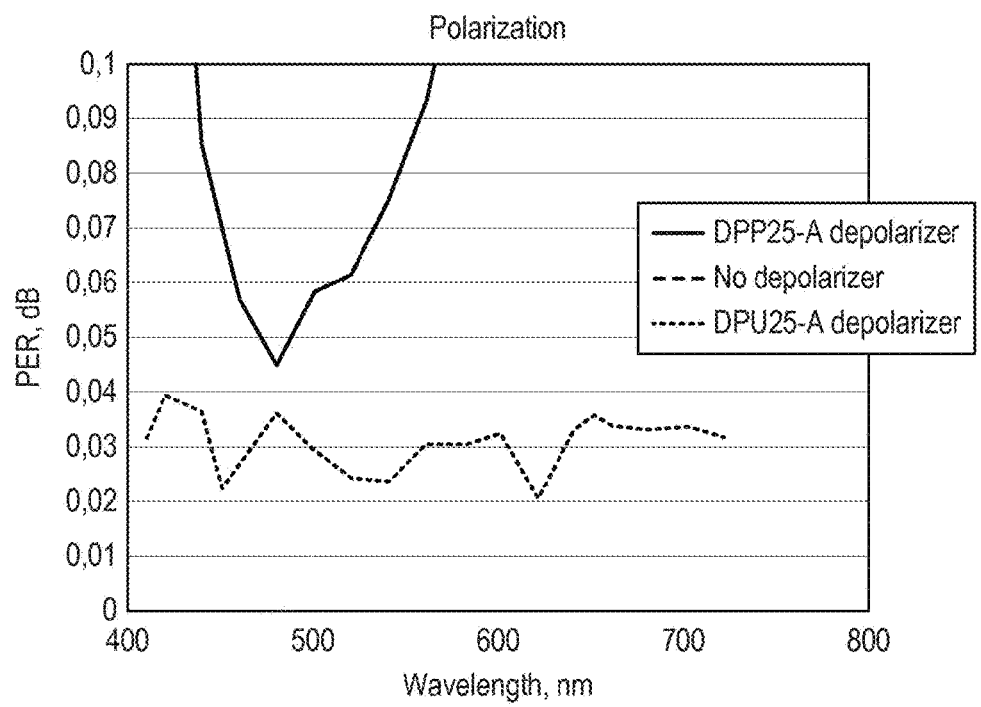

In order to measure the polarization extinction ratio (PER) of the system of FIG. 2(a), the output of the optical head 40 was directed through a polarizer into a power meter. By rotating the polarizer the maximum and minimum powers (Pmax and Pmin) were measured, and the polarization extinction ratio, given by 10 $\text{Log}_{10}$(Pmax/Pmin) was calculated. The procedure was repeated at different wavelengths by selecting different wavelengths using the wavelength selection module 20. The results are shown in FIGS. 5a and 5b, which show measurement results for 3 cases: no depolarizer, liquid crystal polymer depolarizer (DPP25-A) and quartz crystal wedge depolarizer (DPU25-A). As shown, using a quartz crystal wedge depolarizer, a polarization extinction ratio of less than 0.04 dB was achieved in the range 400 nm to 700 nm Although FIG. 2(a) shows the depolarizer located between the microlens arrays and the imaging lens, alternatively the imaging lens may be located between the microlens arrays and the depolarizer. This alternative configured is illustrated in FIG. 2(c). Positioning the depolarizer immediately after the imaging lens (rather than before the imaging lens) did not affect the measurement results shown in FIGS. 5a and 5b.

In a further alternative embodiment, the depolarizer may be located upstream of the microlens arrays, between the collimating lens and the microlens arrays. In this case light passes through the depolarizer before it passes through the one or more microlens arrays to form said plurality of beamlets. In this configuration the depolarizer provides the beam with a polarization which is different in different regions of the beam profile, before the beam is divided into beamlets by the microlens arrays. In this way, the presence of the depolarizer causes alteration of the polarization characteristics of the beamlets, such that different beamlets have different polarization characteristics. The beamlets are then brought into overlap and in the image plane by the imaging lens 44 so as to obtain a high degree of depolarization uniformly distributed across the beam profile.

As will be understood from the foregoing, in various embodiments a depolarizing homogenizer is provided comprising one or more lenslet arrays (e.g. one or more microlens arrays), a depolarizer, and a lens. The lenslet array(s) are adapted for providing a plurality of beamlets associated with different respective parts of a received beam. The depolarizer is positioned, either upstream or downstream of the lenslet array(s), to cause alteration of the polarization characteristics of at least some of the plurality of beamlets. The lens is arranged to at least partially overlap the beamlets having said altered polarization characteristics, to provide an output beam. In various embodiments the output beam has a high degree of depolarization uniformly distributed across the profile of the beam Although two successive lenslet arrays may be employed in some embodiments (e.g. as shown in FIG. 2(a)), in other embodiments a single lenslet array may be employed (e.g. as shown in FIG. 2(b). Moreover although a single depolarizing element may be employed in some embodiments, in some embodiments an even higher degree of depolarization may be achieved by placing two depolarizing elements with optical axis perpendicular to each other. The depolarizer may thus comprise one or more liquid crystal polymers, one or more quartz crystal wedge depolarizers, or a combination of one or more liquid crystal polymers and one or more quartz crystal wedge depolarizers.

Although FIG. 2(a) shows a depolarizing homogenizer used in conjunction with a supercontinuum source having a wavelength selection module, a coupling module and a fiber bundle, the depolarizing homogenizer may be employed in conjunction with any suitable supercontinuum source. For example in some embodiments one or more, including all, of the wavelength selection module, coupling module and fiber bundle may be omitted. For example, in some embodiments the depolarizing homogenizer may be used in conjunction with a supercontinuum source which does not employ a wavelength selector, but employs a coupling module and/or fiber bundle.

Moreover depolarizing homogenizers according to various embodiments may alternatively be used in conjunction with other linearly or partly linearly polarized sources such as a narrowband single wavelength, tunable or other broadband light sources. For example, in various embodiments the depolarizing homogenizer may be used in conjunction with a single wavelength laser, tunable laser, LED, or other suitable source.

The invention claimed is:

1. A light source, comprising:
  a supercontinuum source for generating a supercontinuum;
  a fibre bundle, wherein the fibre bundle includes a plurality of optical fibres for guiding the light; and
  a depolarizing homogenizer, configured to receive light derived from the supercontinuum source, comprising:
  one or more lenslet arrays, adapted for providing a plurality of beamlets associated with different respective parts of a received beam, wherein the one or more lenslet arrays comprise a first lenslet array and a second lenslet array, wherein the first and second lenslet arrays are oriented with respect to one another such that the lenslets of the first and second lenslet arrays are perpendicular to one another, wherein the lenslets of the first and second lenslet arrays are non-symmetric lenslets;
  a depolarizer comprising different areas which affect polarization differently, wherein the depolarizer is positioned to cause alteration of the polarization characteristics of at least some of said plurality of beamlets; and
  a lens arranged to at least partially overlap the said beamlets having said altered polarization characteristics, to provide an output beam,
  wherein the one or more lenslet arrays comprise a plurality of lenslets shaped to cause the output beam to have a flat top beam profile in the image plane of the lens,
  wherein the depolarizer is located between an output of the fibre bundle and an image plane of the lens,
  wherein the fibre bundle is configured such that when light propagates through the fibre bundle, then the fibre bundle contributes to affecting the polarization.

2. The light source according to claim 1, wherein the depolarizer is positioned to receive said plurality of beamlets, wherein at least some of said beamlets pass through respective different areas of the depolarizer, thereby to alter the polarization characteristics of said at least some beamlets.

3. The light source according to claim 1, wherein the depolarizer is located between at least one of the one or more lenslet arrays and the lens.

4. The light source according to claim 1, wherein the lens is located between at least one of the one or more lenslet arrays and the depolarizer.

5. The light source according to claim 1, wherein the depolarizer is configured to depolarise light before the light passes through the one or more lenslet arrays to form said plurality of beamlets, thereby to cause alteration of the polarization characteristics of at least some of said plurality of beamlets.

6. The light source according to claim 1, wherein the depolarizer comprises a first depolarizing element having a first optic axis and a second depolarizing element have a second optic axis, wherein the first and second depolarizing elements are oriented such that the first and second optic axes are at an angle to one another, wherein optionally the first and second depolarizing elements are oriented such that the first and second optic axes are perpendicular to one another.

7. The light source as claimed in claim 1, further comprising a collimating lens to receive light from the fibre bundle and to collimate the received light, wherein the one or more lenslet arrays are arranged to receive light which has been collimated by the collimating lens.

8. The light source as claimed in claim 1, wherein the one or more lenslet arrays comprise a plurality of lenslets shaped to cause the output beam to have a square or rectangular beam profile.

9. The light source as claimed in claim 1, wherein the supercontinuum includes a wavelength range of 375 nm to 1200 nm.

10. The light source as claimed in claim 1, wherein the supercontinuum includes a wavelength range of 375 nm to 2400 nm.

11. The light source as claimed in claim 1, wherein the supercontinuum includes a wavelength range of 1100 nm to 4200 nm.

12. The light source according to claim 1, wherein the light source further comprises a wavelength selector to select one or more wavelengths from the supercontinuum.

13. The light source according to claim 1, wherein the lenslets of the first and second lenslet arrays are cylindrical microlenses.

* * * * *